Nov. 24, 1953
H. A. RAHMEL
2,660,508
SYSTEM AND APPARATUS FOR DETERMINING THE LISTENING
HABITS OF WAVE SIGNAL RECEIVER USERS
Filed July 23, 1947
5 Sheets-Sheet 1
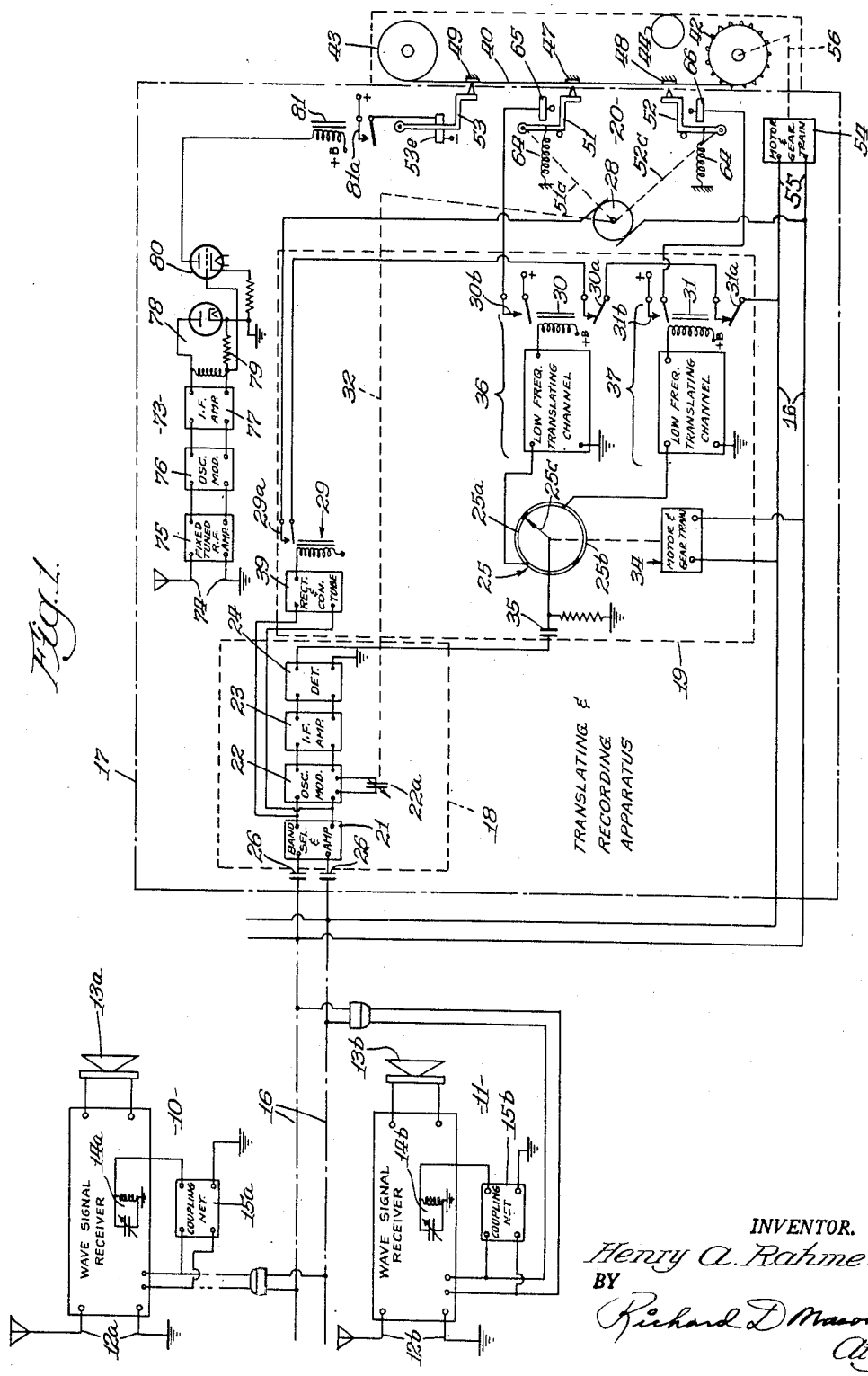
INVENTOR.
Henry A. Rahmel
BY
Richard D. Mason
Atty.

Nov. 24, 1953
H. A. RAHMEL
2,660,508
SYSTEM AND APPARATUS FOR DETERMINING THE LISTENING
HABITS OF WAVE SIGNAL RECEIVER USERS
Filed July 23, 1947
5 Sheets-Sheet 2
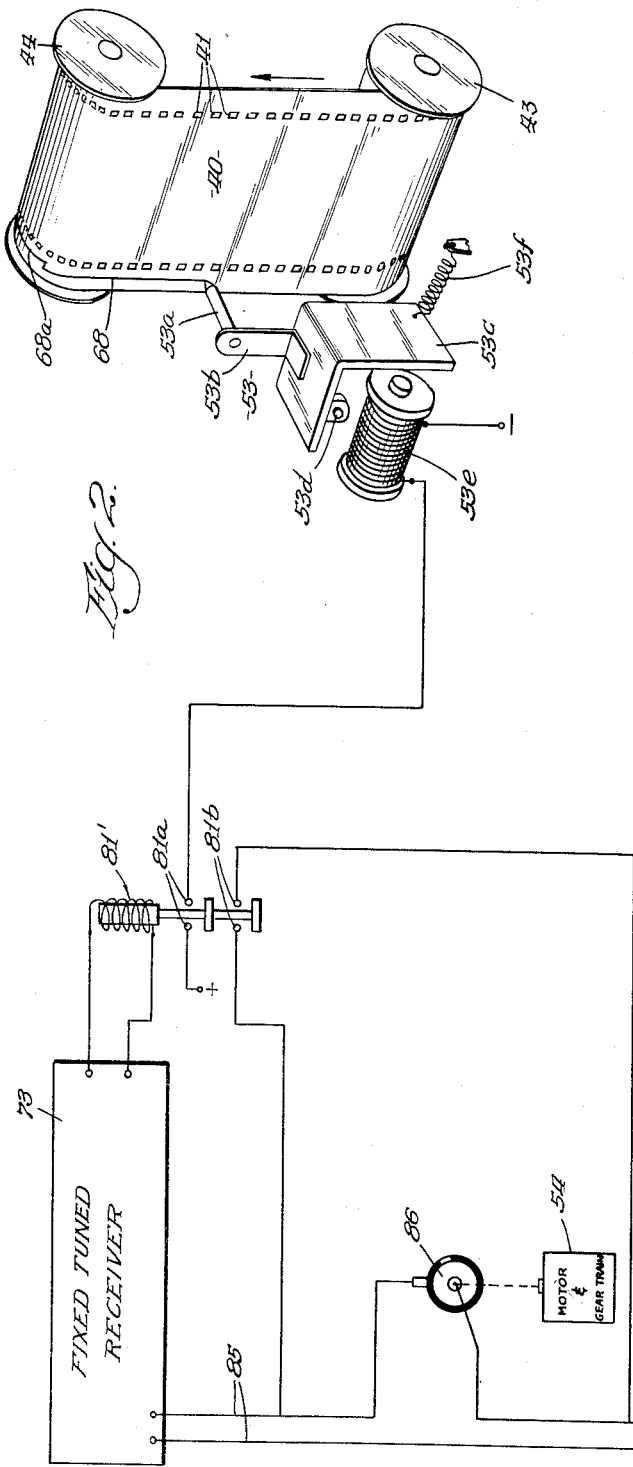
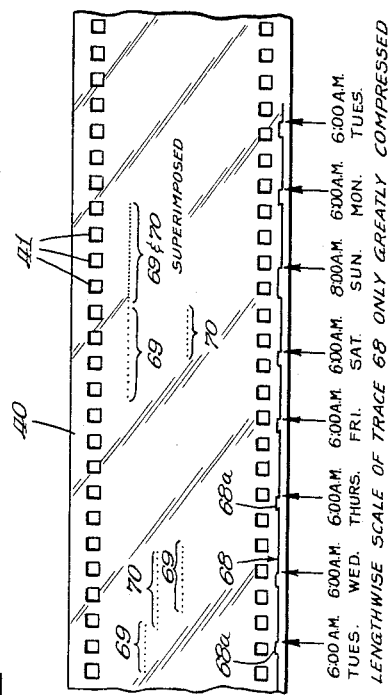
INVENTOR.
Henry A. Rahmel
BY
Richard D. Mason
Atty.

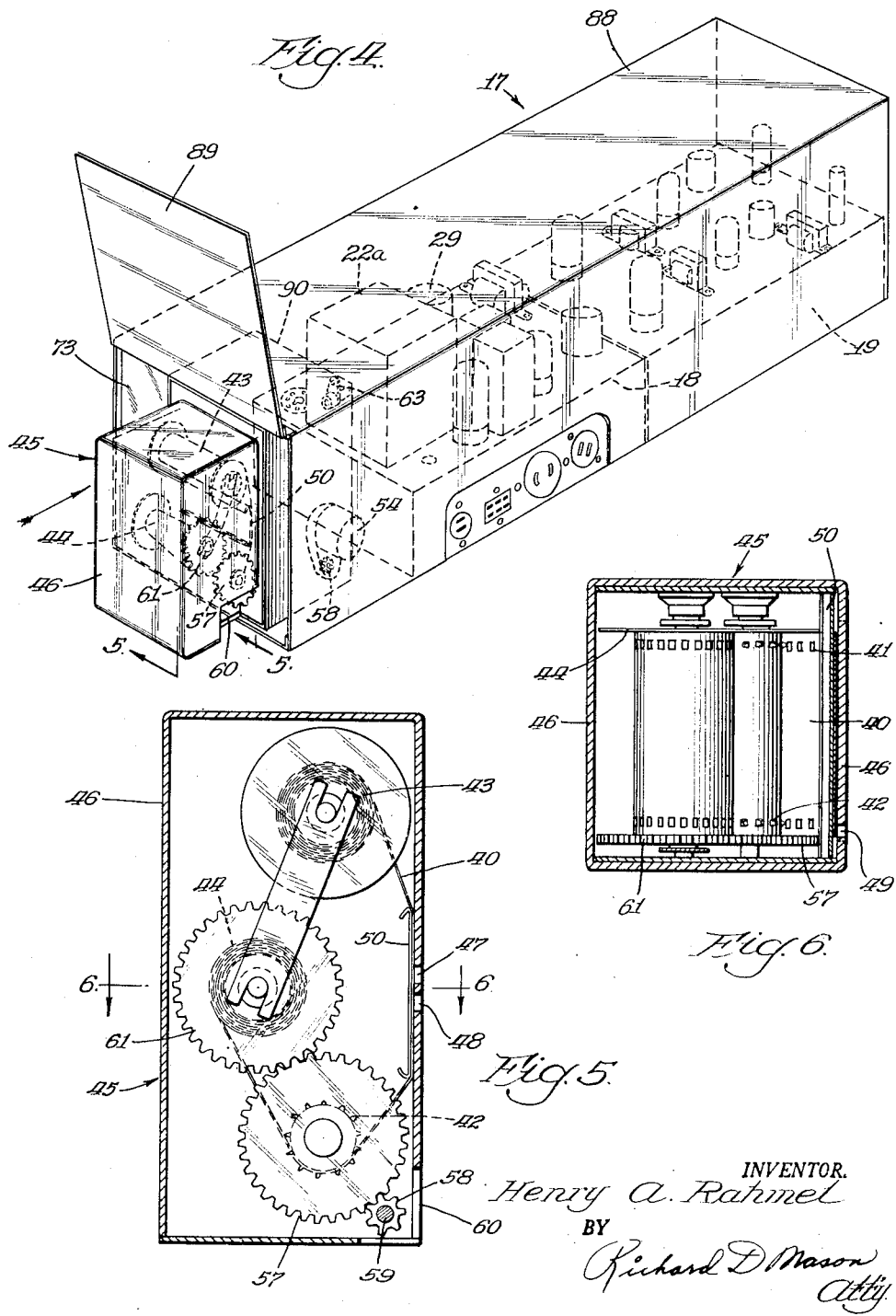

Nov. 24, 1953  H. A. RAHMEL  2,660,508
SYSTEM AND APPARATUS FOR DETERMINING THE LISTENING
HABITS OF WAVE SIGNAL RECEIVER USERS
Filed July 23, 1947  5 Sheets-Sheet 4

INVENTOR.
Henry A. Rahmel
BY
Richard D Mason
Atty.

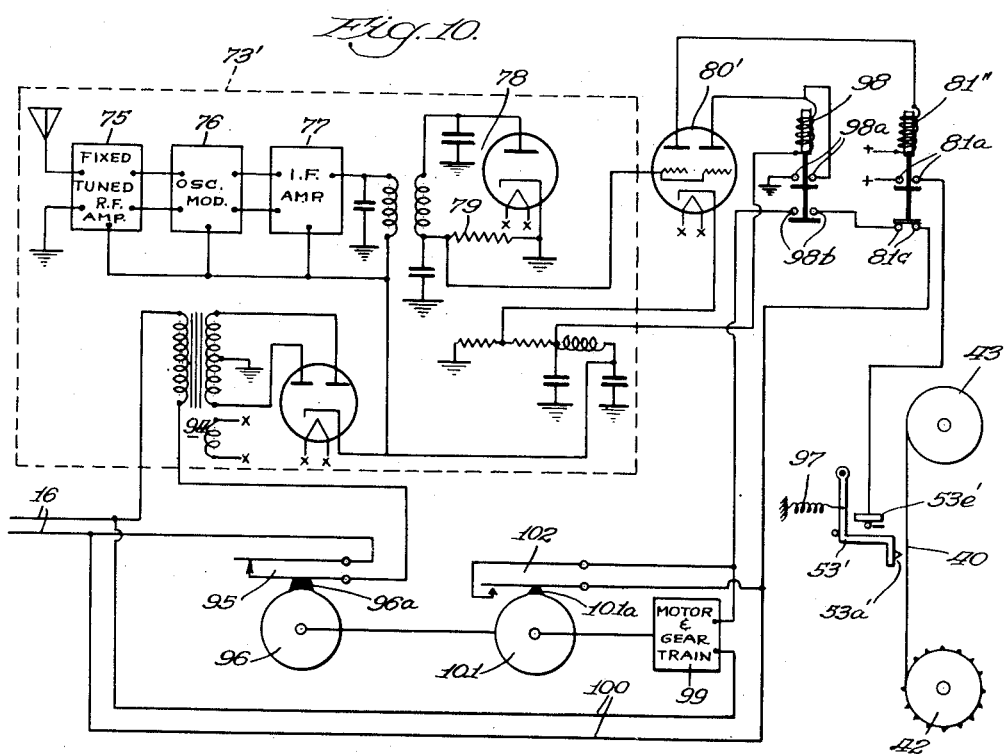

Patented Nov. 24, 1953

2,660,508

UNITED STATES PATENT OFFICE 2,660,508

SYSTEM AND APPARATUS FOR DETERMINING THE LISTENING HABITS OF WAVE SIGNAL RECEIVER USERS

Henry A. Rahmel, Evanston, Ill., assignor to A. C. Nielsen Company, Chicago, Ill., a corporation of Illinois Application July 23, 1947, Serial No. 762,962

34 Claims. (Cl. 346—37)

The present invention relates to systems and apparatus for determining the listening habits of users of wave signal receivers of the broadcast type and more particularly to improvements in systems and apparatus for determining the audience popularity rating of different programs transmitted from one or more wave signal transmitters and for gathering other information of great importance in determining the effectiveness of radio advertising.

Instrumented methods of determining the listening habits of home radio receiver users generally involve the use of a recording device operating in conjunction with each collaborator receiver used in the sampling system, to record the extent of use of the receiver and to record as a function of time the wave signal transmitters to which the receiver is tuned for program reception. The usual device of this character embodies facilities for driving a record receiving or recording element such as a tape, for example, at a constant speed and translating means for variably positioning a recording stylus relative to the record receiving element in accordance with changes in the tuning of the receiver. The positions of the record indications along the record receiving element provide the necessary recorded information from which it is possible to determine the particular stations to which the receiver was tuned and also the length of time to which the various stations were tuned in by the receiver. Thus, with a given starting time of the record receiving element accurately marked thereon, each following point along the record receiving element is representative of a later chronological instant so long as the record receiving element is driven at a constant speed.

Heretofore representatives of the analysis organization in the nature of field men have been employed to visit periodically the homes of collaborators to gather up the record receiving elements or tapes upon which recordings have been made and to replace these record receiving elements or tapes with new record receiving elements for obtaining information for the subsequent period. In removing the tape upon which a record has been produced and replacing it with a new tape, the procedure followed by the field man was in some respects quite similar to that of loading the roll of film in a movie camera. However, due to the importance of the time element, it was necessary for each field man to carry an accurate timepiece and to indicate at the end of the tape removed from the recording apparatus the exact time and date that it was removed from operation and to indicate on the new tape to be placed in the recorder the exact time and date that it was put into operation. Thus on each record receiving element or tape there were provided accurate time indications at the beginning and end thereof which were manually placed thereon. If there was no power failure or other abnormal condition causing the tape to move at other than a constant speed throughout the whole calendar period that the tape was in operation, the length of the tape removed should correspond to the product of the speed of movement of the tape and the interval of time between the two manually applied time notations at the beginning and end thereof.

It will be apparent that the cost of obtaining a sample of the listening habits of several hundred radio users necessary to make a statistical analysis concerning such habits from which the factors affecting the sales effectiveness of particular radio programs may be accurately arrived at is influenced to a considerable extent by the expense of having numerous field men making visits to the homes of collaborators at periodic intervals of thirty days or the like. It would be desirable to be able to dispense with such field men by providing a recording device in which the record receiving element or tape is mounted in a suitable magazine which can readily be replaced or removed by anyone in a minimum of time without any skill or training. The magazine containing the tape which has thereon a record of the listening habits of the users of one or more receivers for a predetermined calendar period would be mailed into the headquarters of the analysis organization which at periodic intervals would also supply the collaborator with replacement magazines for those ready to be decoded. Such a mailable recording magazine must be fool-proof so that the collaborator can not make a mistake in applying it to the apparatus or removing it therefrom. Furthermore, to avoid complication in replacing magazines and to avoid "conditioning the sample" it is necessary to avoid having the collaborator place any time information on the tape as was heretofore required of the field men. Since it is essential that a time base be provided on the record receiving element, it would also be desirable to have such time information applied thereto automatically and often enough to permit the use of the major part of the recorded information on the record receiving element even though for reasons of intermittent power failure the constant speed driving means therefore failed to operate continuously due to the power failure or the like.

It will be understood that due to the great expense of employing a large number of field men the periods between visits for tape replacing purposes were of necessity relatively long. It would be desirable to provide an arrangement which permits more frequent delivery of data to the analysis organization thereby materially increasing the speed of delivery of final data to the clients of the service organization.

Accordingly, it is an object of the present invention to provide a new and improved apparatus and system of the character described having the desirable features enumerated above so that the collaborator may with little effort perform the tape exchanging function heretofore required of the field man, whereby the cost of obtaining the essential information is greatly reduced.

It is another object of the present invention to provide new and improved apparatus of the character described in which the recording mechanism employs a magazine loading device or record receiving element holder.

It is another object of the present invention to provide new and improved apparatus and system of the character described in which accurate time markings are periodically and automatically applied to the record receiving element in a simple manner, whereby manually applied time information may be dispensed with entirely.

It is another object of the present invention to provide in a system of the character described improved facilities for more positively correlating with time the record indications identifying the particular transmitting stations from which programs are received.

It is a still further object of the present invention to employ the sign-off or sign-off times of a particular transmitting station to correlate the record indications representing the stations listened to with respect to time.

In accordance with a feature of the present invention the sign-off or sign-on time or both of a particular radio transmitting station is employed to produce daily indications on the record receiving element employed to record with respect to time the particular transmitting stations to which various receivers are tuned, whereby a check of the time scale is provided and wherein the sign-off or sign-on times of said particular radio transmitting station furnish the time base from which time can be calculated in decoding the information on the record receiving element.

It is another object of the present invention to provide in a system of the character described improved means which permits more frequent delivery of essential data recorded on a suitable element to an anlysis organization without increase in cost.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is a schematic diagram of the system of a radio listening habit recording device embodying the magazine loading device and the automatic time marking arrangement of the present invention;

Fig. 2 is an enlarged semi-schematic, semi-perspective view of the apparatus for automatically producing time markings on the record receiving element illustrating a minor modification from that shown in Fig. 1;

Fig. 3 is an enlarged perspective view of a portion of the record receiving element illustrating the time markings thereon with the lengthwise scale of the time markings greatly compressed in order that a full week's time indication may be illustrated thereon;

Fig. 4 is a perspective view of the translating and recording equipment employed in connection with the radio recording device system shown in Fig. 1 which is preferably remotely located with respect to the radio receiver or receivers which are being monitored, the magazine loading mechanism being shown in a position during the loading or unloading operation;

Fig. 5 is a sectional view taken on line 5—5 of Fig. 4;

Fig. 6 is a sectional view taken on line 6—6 of Fig. 5 assuming that Fig. 5 shows a complete mechanism;

Fig. 9 is a view similar to Fig. 5 illustrating a modification thereof;

Fig. 10 is a schematic diagram of a modification of the time marking arrangement shown in Figs. 1 and 2; and Fig. 11 is a perspective view of a modified element of the recorder shown in Fig. 4.

Figure 7:
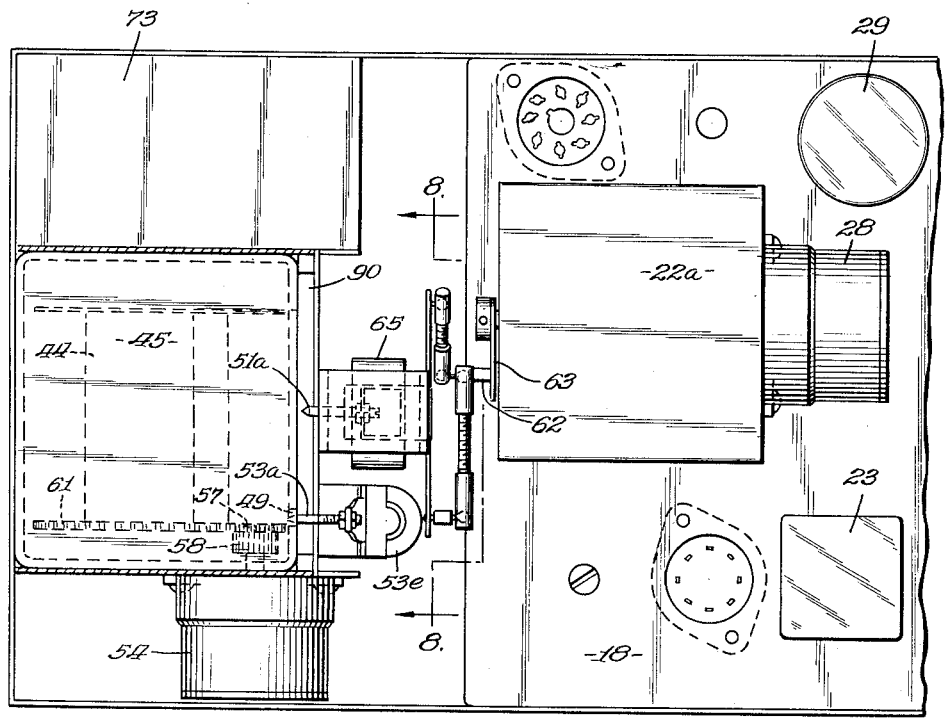
Fig. 7 is an enlarged plan view of a portion of the mechanism shown in Fig. 4.
Figure 8:
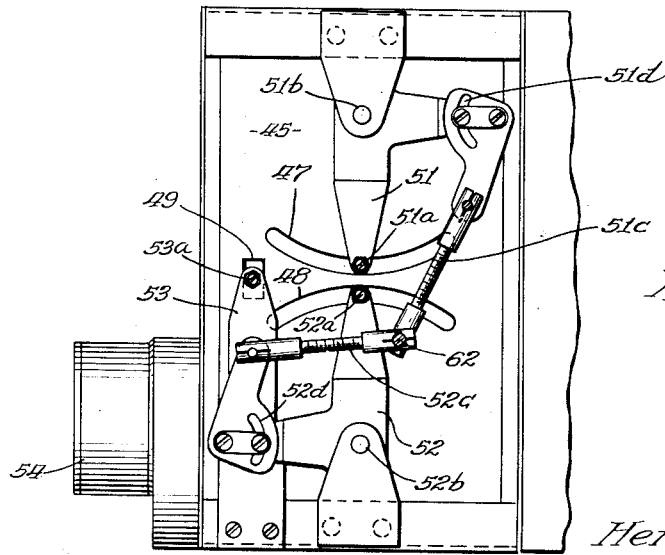
Fig. 8 is a sectional view taken on line 8—8 of Fig. 7.

It should be understood that the record receiving element magazine or magazine loader and the necessary means for automatically obtaining accurate time correlation indications on the record receiving element, with which the present invention is particularly concerned, is applicable to various systems and apparatus for determining the listening habits of a radio audience. In order to illustrate the present invention, however, it has been shown as applied to a particular type of system satisfactory for use in monitoring the receivers in a multi-receiver home and specifically in connection with the arrangement disclosed and claimed in prior co-pending application Serial No. 725,480 filed January 31, 1947, and assigned to the same assignee as the present application.

Referring now to Fig. 1 of the drawings, there is disclosed and briefly described hereinafter a system for determining the listening habits of wave signal receiver users in order that the apparatus of the present invention associated therewith may better be understood. A substantial portion of the arrangement disclosed in Fig. 1 of the drawings is fully disclosed and claimed in the prior co-pending application referred to above. Although the present invention is equally applicable to devices for monitoring the receivers of single receiver homes, it is specifically disclosed in the more general application of a multi-receiver home. Accordingly in Fig. 1 of the drawings, there are illustrated two wave signal receivers specifically designated at 10 and 11 which may comprise the plurality of receivers in a multi-receiver home. These receivers 10 and 11 may be of any suitable type, although they are preferably of the superheterodyne type, each comprising an antenna-ground circuit 12 as the input of the receiver and the signal reproducer or loudspeaker 13 as the output of the receiver. The corresponding parts of the receivers 10 and 11 are designated by the same reference numerals with the parts of the receiver 10 having the subscript (a) appended to the reference numerals, and the parts of receiver 11 having the subscript (b) appended to the reference numerals. Interposed between the antenna-ground circuits 12 and the signal reproducers 13 are the usual stages comprising, for example, a tunable radio frequency amplifier, a mixer or modulator, an intermediate frequency amplifier, a detector, and an audio frequency amplifier. The receivers 10 and 11 are entirely conventional, and the mode of operation thereof is apparent to those skilled in the art.

It will be understood that superheterodyne receivers include a local oscillator section, a portion of which is designated by the reference numeral 14 in connection with the receivers 10 and 11. With such receivers the reception of any program carrier from a given wave signal transmitter will be represented by a definite output frequency of the local oscillator of each receiver, a section of which is represented at 14 in the drawings. This output frequency of the oscillator may be used to identify the particular transmitting station to which the receivers 10 and 11 are tuned for program reception at any particular time.

Although only two receivers 10 and 11, which preferably are disposed in a single multi-receiver home, have been illustrated, it should be understood that in actual practice several hundred broadcast receivers located in homes within the radiation areas of different sets of wave signal transmitters broadcasting the particular programs of interest are employed to provide the record information concerning the listening habits of the receiver users necessary to a statistical analysis from which the various factors affecting the sales effectiveness of particular programs may be accurately arrived at. In using the system, it is contemplated that selection of the system collaborator homes—that is, the homes in which wave signal receiver use is to be logged—shall be on a basis such that all of the variable factors, such, for example, as number of potential listeners, economic affluence, religion, etc., which normally affect any process of sampling public opinion, are accounted for on a weighted basis. In the interests of simplifying the disclosure, however, only two wave signal receivers 10 and 11 from a multi-receiver home and the associated recording facilities therefore are shown in Fig. 1 of the drawings.

For the purpose of producing a decodable record accurately and positively identifying all programs received at the respective collaborator receivers used in the analysis during any given calendar period each collaborator receiver is provided with a network 15 coupled between the local oscillators, a portion of which is shown at 14 in connection with receivers 10 and 11, and a signal channel extending to a remote recording point. The networks 15 impress a signal on the signal channel having a frequency respresentative of the output frequency of the local oscillator section of the particular receiver such as 10 or 11. It will be understood that the equipment required at the wave signal receivers, such as 10 and 11, is maintained at a minimum and the larger or bulkier equipment associated with the recording apparatus must be disposed at a remote point such as a basement or closet in the home. As is illustrated, the coupling networks 15 of the receivers 10 and 11 are connected to the power supply conductors 16 of the home, for example, which serve as a link for connecting the receivers 10 and 11 with a remote recording point where there is provided the translating and recording equipment generally designated at 17. Instead of a direct connection such as the power line 16 for relating the coupling networks 15 with the translating and recording equipment 17 it will be understood that a space link may be employed. The specific construction of the coupling networks 15 and their connection to the recording and translating equipment 17 forms no part of the present invention but is fully disclosed and claimed in the above-mentioned co-pending application.

At the translating and recording point the variable characteristic of each received signal voltage is utilized to control suitable record producing means such as one or more styli, for example, for producing a record or records identifying the transmitting stations to which the receivers 10 and 11 are tuned. This translating and recording equipment 17 may be of the form disclosed in Woodruff Patent 2,305,834, granted December 22, 1942, but preferably is of the form disclosed and claimed in the prior co-pending application referred to above. In brief, the translating and recording equipment 17 is divided into several principal components, a hunter unit 18, a duplexing control unit 19 and a recorder unit 20. The hunter unit 18 comprises a band pass selector and amplifier 21 broadly tuned to receive and transmit in amplified form any signal received from the networks 15, a mixer or oscillator-modulator 22, an intermediate frequency amplifier 23, and a detector and control tube 24 connected in tandem in the order named. The input terminals of the band pass selector and amplifier 21 are illustrated as being coupled to the power supply conductors 16 through the coupling capacitors 26 although they might equally well be connected to an antenna-ground circuit in the event that a space link is employed between the translating and recording equipment 17 and the receivers 10 and 11. The local oscillator section of the oscillator-modulator 22 is controlled by means of a tuning condenser 22a over a band at least as wide as that capable of being superimposed on the conductors or link 16 by the coupling networks 15 in response to the tuning of the local oscillator sections of the receivers 10 and 11. Tuning of the oscillator section of the oscillator-modulator 22 is under the control of a sweep motor 28 adapted for energization from the supply conductors 16 through a plurality of serially arranged contacts 29a, 30a, and 31a of the relays 29, 30 and 31 respectively, illustrated as a part of the duplexing control unit 19. Preferably, the sweep motor 28 is connected to the shaft of the condenser 22a. This connection is schematically shown in Fig. 1 of the drawings by the dashed line 32. The structural arrangement of the sweep motor 28 and the condenser 22a is shown in Fig. 7 of the drawings. The name hunter unit is applied to the unit 18 because of the hunting action of the tuning condenser 22a controlled by the sweep motor 28.

Any suitable means for producing independent records representative of the transmitting stations to which the receivers 10 and 11 are tuned may be employed. One such means illustrated in the drawings comprises the duplexing control unit 19 which includes the commutating device 25 having a wiper 25c driven continuously by a suitable synchronous motor and gear train assembly specifically designated as 34, which motor is connected for energization to the power supply conductors 16. This commutating device 25 is provided with two segments 25a and 25b because it is desired to make a separate record for each of two receivers 10 and 11. If the multi-receiver home has more than two receivers, the number of segments of the commutator device 25 would be increased to correspond with the number of receivers in the multi-receiver home. It will be understood that if the home of the collaborator only employed a single receiver, then the commutating device 25 and some of the associated apparatus to be described hereinafter could be dispensed with, since the purpose of the commutating device is to enable independent records to be made for the various receivers in a multi-receiver home. The wiper 25c of the commutating device 25, which is continuously rotated by the motor and gear train mechanism 34 is connected through a suitable coupling condenser 35 to the output side of the detector 24. Each commutating device segment such as 25a and 25b is connected to a different translating channel. As illustrated, the commutating device segment 25a is connected to a translating channel 36, while the segment 25b is connected to a translating channel 37. Thus the output of the detector 24 is successively connected with the translating channels 36 and 37 for intervals of equal duration the length of which is determined by the speed of rotation of the wiper 25c. Preferably the wiper 25c rotates at a speed such that the time required to move across one segment, such as 25a and 25b, corresponds to the time it takes the sweep motor 28 to make one revolution. This would be true even though commutating device 25 had more than two segments.

As fully disclosed and claimed in the above-mentioned co-pending application, the coupling networks 15a and 15b are capable of impressing modulated signals on the link 16, each having a different modulation component of different relatively low fixed frequencies preferably bearing no harmonic relationship to each other. The modulated signals are of course also representative of the outputs of the local oscillators and consequently of the broadcasting stations to which the receivers 10 and 11 are tuned. The translating channel 36 is arranged so as to be capable of passing only the modulated signal produced at the coupling network 15a, while the translating channel 37 is arranged so as to be capable of passing only the modulated signal produced at the coupling network 15b. This can readily be accomplished by employing sharply tuned resonant circuits in each of the translating channels 36 and 37. Preferably these translating channels 36 and 37 are so designed that when they receive a signal associated relays 30 and 31 respectively are de-energized. Normally these relays 30 and 31 are energized to maintain the contacts 30a and 31a respectively closed. The relay 30 also includes the contacts 30b which are open when the contacts 30a are closed. Similarly the relay 31 includes the contacts 31b which are also open when the contacts 31a are closed. In view of the series connection of the contacts 30a and 31a in the circuit of the sweep motor 28, the passing of a signal by either one of the translating channels 36 and 37 will cause de-energization of the sweep motor 28 by de-energizing one of the relays 30 or 31 and opening one of the sets of contacts 30a or 31a respectively.

In order to prevent the sweep motor 28 from operating during those intervals when neither of the receivers, such as 10 or 11, being monitored is in operation, the duplexing control unit 19 also includes a rectifier and control tube unit 39, the input of which is coupled directly to the output terminals of the band selector and amplifier unit 21. The output of the unit 39 is connected to the relay 29 in such a manner that the passing of a signal by the unit 21 indicating use of at least one of the receivers 10 or 11 causes closing of the contacts 29a. Concurrent non-use of the several receivers, such as 10 and 11, causes the contacts 29a of the relay 29 to be opened, thereby opening the power circuit to the sweep motor 28. As soon as any one or both of the receivers 10 or 11 is turned on, a signal is impressed on the link 16, and the relay 29 is caused to close its contacts 29a to energize the sweep motor 28.

The recording equipment generally designated at 20 and shown in greater detail in Figs. 2, 4, 5, 7 and 8 of the drawings includes a movable record receiving element best shown in Figs. 2, 3 and 5 of the drawings. It should be understood that any suitable recording element such as a magnetic element may be employed. For the purpose of illustrating the invention the record receiving element is shown as a recording tape 40. This recording tape 40 is provided with edge perforations 41 so that it may be driven at constant speed by a driving sprocket 42 having spaced peripheral teeth engageable with the edge perforations 41 in the tape 40. The tape is movable between a supply spool 43 and a take-up spool 44. In accordance with the present invention the portion of the recording equipment described thus far is mounted in a small, mailable magazine generally designated at 45, including a housing 46. The members 42, 43, and 44 are suitably mounted therein as shown in Figs. 5 and 6 of the drawings so that the tape 40 is movable along the inside of one wall of the housing 46, which wall is provided with suitable non-concentric arcuate openings 47 and 48 and a smaller opening 49. A platen 50 is positioned so that the tape 40 moves between the wall and said platen, whereby support for the tape 40 is provided when engaged by a plurality record producing means such as suitably styli generally designated as 51, 52, and 53 and described in greater detail hereinafter. These styli, 51, 52, and 53, are adapted to extend through the openings 47, 48, and 49 respectively in the housing 46 of the mailable magazine 45 at least when engaging the tape 40 in a trace producing manner.

To drive the sprocket 42 at constant speed and therefore to assure constant speed movement of the tape 40, there is provided a constant speed driving mechanism 54 which is schematically illustrated in Figs. 1 and 2 of the drawings and which comprises a synchronous motor and gear train arrangement. As illustrated, this synchronous motor is preferably connected to a source of alternating power such as the power line 16 through suitable conductors 55. Heretofore such constant speed driving mechanism also included a spring actuated stand-by clock device normally maintained in a wound condition by the synchronous motor of the driving mechanism. Such a stand-by clock was heretofore adapted to be connected in driving relationship with the drive for the record receiving element through the electromagnetic actuation of a clutch device in response to de-energization of the synchronous driving motor during a period of power failure. Although such a stand-by clock may be provided if desired it is not required in view of the means to be described hereinafter for automatically applying time markings on the record receiving element. Hence another advantage of the present invention is the elimination of the requirement for a stand-by clock.

It will be understood that the driving mechanism 54 must be exteriorly positioned relative to the housing 46 of the record tape magazine 45 which magazine is mailable as mentioned above. Consequently, a suitable releasable driving connection schematically indicated as 56 in Fig. 1 of the drawings is provided to relate the sprocket 42 to the driving mechanism 54. Preferably the sprocket 42 is provided with a suitable driving gear 57 which meshes with a cooperating gear 58 fastened to a shaft 59 extending from the driving mechanism 54. It will be understood that the housing 46 must be provided with a cut-away portion generally designated at 60 in Figs. 4 and 5 of the drawings which permits exposure of a portion of the gear 57 so that it may be moved into driving engagement with the gear 58. The gears 57 and 58 may be worm gears if desired or ordinary gears of the type illustrated in Fig. 5 of the drawings. The worm gear arrangement provides an advantage due to the gear reduction provided thereby.

It will also be understood that suitable means must be provided to maintain the element or tape 40 taut between the supply and take up spools 43 and 44. This may be accomplished by driving the take up spool 44 from a gear 57 by means of a suitable gear 61 through a clutch arrangement, not shown, whereby slippage of the clutch occurs when the tape is taut, the take up spool 44 being driven slightly faster than the movement of the tape 40. The supply spool 43 may merely be provided with a friction drag arrangement which will adequately maintain the tape in a taut condition. The arrangement described for maintaining the tape taut is quite satisfactory but is relatively complicated and a much simpler arrangement is disclosed in Fig. 9 of the drawings where the corresponding parts are designated by the same reference numerals. In Fig. 9 the parts are arranged so that the tape 40 engages the circumference of the driving sprocket 42 subtended by an angle of substantially 270°. In order to provide a friction drag for the supply spool 43, there is provided an elastic belt brake 92 which may be a spring belt or some other form of elastic belt fastened to the housing 46 in a manner to apply a braking force to the supply spool 43. Similarly the take up spool 44 is driven from the sprocket 42 by means of an elastic belt 93. The pulleys provided on the take up spool 44 and the sprocket 42 are of such relative sizes as to slightly overdrive the take up spool 44 thereby tending to keep the tape taut. It will be apparent that with this arrangement a very simple device is provided without the requirement of clutches and the like. It will also be understood that if the tape 40 is capable of having a substantial tension applied thereto the elastic belts 92 and 93 could be replaced by a single elastic belt interconnecting suitable pulleys associated with the supply and take up spools 43 and 44 respectively.

In order to produce desirable indications on the record tape 40, it is apparent that the styli 51, 52, and 53 must be controlled in a suitable manner. The styli 51 and 52 are adapted to provide indications on the tape 40 of the particular broadcasting stations to which the receivers 10 and 11 are respectively tuned. Accordingly, the styli 51 and 52 are pivotally supported as indicated at 51b and 52b respectively in Fig. 8 of the drawings so that the inscribing portions 51a and 52a thereof are adapted to move in an arcuate path somewhat defined by the arcuate openings 47 and 48. Pivotal movement of the styli 51 and 52 so as to cause the inscribing points 51a and 52a to move in the arcuate path referred to is provided by virtue of a suitable mechanical linkage designated as 51c for the stylus 51 and 52c for the stylus 52. Each linkage mechanism includes an adjustable member such as 51d for the stylus 51 and 52d for the stylus 52, whereby the throw of the inscribing points 51a and 52a may be adjusted so as to be confined within the arcuate openings 47 and 48 respectively. The ends of the linkage mechanism 51c and 52c are connected to a shaft 62 which in turn is connected to a crank 63 driven by the sweep motor 28. In the structural arrangement shown in Fig. 7 of the drawings, the sweep motor 28 is preferably drivingly connected with the condenser 22a and the crank 63 is indicated as being provided at the end of the condenser tuning shaft. It is apparent that with this arrangement the styli 51 and 52 are adapted to move back and forth transversely of the record tape 40 when the sweep motor 28 is energized to drive the tuning condenser 22a over its tuning range. Preferably the styli 51 and 52 have the inscribing portions 51a and 52a normally out of contact with the tape 40. They may, for example, be provided with pivotal means permitting movement toward and away from the record tape 40 with suitable spring means such as 64 (Fig. 1) for biasing the inscribing portions thereof away from the tape. To render the styli 51 and 52 effective to make a record on the movable recording element or record tape 40, an electromagnet 65 is provided for the stylus 51 and an electromagnet 66 is provided for the stylus 52. As is schematically illustrated in Fig. 1 of the drawings, these electromagnets 65 and 66 are each adapted to be energized from a separate suitable control circuit in series with the contacts 30b and 31b respectively of the relays 30 and 31. Whenever the contacts 30b are closed, the electromagnet 65 is energized and the stylus 51 is rendered effective to engage the recording tape 40. Similarly, whenever the contacts 31b are closed, the electromagnet 66 is energized to render the stylus 52 effective to engage the tape 40.

The particular construction of the record producing means such as 51 and 52 forms no part of the present invention and of course will depend to a considerable extent upon the type of record receiving element 40 that is employed. If desired, the styli may be of the form disclosed and claimed in co-pending application Serial No. 737,529—Krahulec—filed March 27, 1947, and assigned to the same assignee as the present application. By virtue of the non-concentric arcuate openings 47 and 48 it is possible, when the styli 51 and 52 are continuously in contact with the recording element, readily to determine which trace is made by which stylus, without the identifying means, merely by following the trace to the arcuate position when the respective stylus swings across the tape. It will be understood that if the inscribing portions of the styli employ ink or a suitable writing fluid that very satisfactory results may be obtained since different colors of ink may be employed for the different styli 51 and 52. In such a case identification of the traces may be had even though the styli are in record-producing engagement with the record receiving element only after the sweep motor 28 has been deenergized. In the event that a wax tape is used, for example, a metallic inscribing point may be employed on each of the styli which inscribing point will remove wax from the tape thus inscribing a record thereon.

In view of the fact that the styli 51 and 52 are adapted at times to swing across the record tape between the edge perforations 41 therein, it is apparent that the stylus 53 in order not to interfere with the record produced on the tape 40 by the styli 51 and 52 should produce a record on the tape outside the range of the styli 51 and 52. The function of the stylus 53 which will be brought out in greater detail hereinafter can be accomplished by positioning the stylus or the inscribing portion 53a thereof so as to produce a record between one edge of the tape and the adjacent row of perforations 41. This is clearly shown in Fig. 2 of the drawings. Although the stylus 53 may be identical with the styli 51 and 52, it is illustrated as being somewhat modified in that the inscribing point 53a thereof for a purpose which will become apparent hereinafter is continually biased into engagement with the tape 40 as by means of a spring support 53b thereby providing a continuous trace on the tape 40 as indicated by the line 68 in Figs. 2 and 3 of the drawings. The spring support 53b is preferably mounted on an armature 53c pivotally mounted at 53d and controlled by an electromagnet 53e. Upon energization of the electromagnet 53e the inscribing portion 53a of the stylus 53 is adapted to move laterally a small amount as, for example, one-sixteenth of an inch or so, whereby the record trace produced, indicated at 68, in Figs. 2 and 3 of the drawings is displaced slightly as indicated at 68a. The function and operation of the stylus 53 which forms an important part of the present invention will be described in detail hereinafter. The stylus 53 has been described at this point merely to complete the description of the recorder 20 of which it forms a part. It should be understood that the styli 51 and 52 may also be continuously biased into engagement with the tape 40 whereby the non-concentric movement thereof will enable ready identification of the traces made thereby as mentioned above.

Briefly to consider the mode of operation of the translating and recording equipment 17 described thus far, it is pointed out that the recorder 20 insofar as tape movement is concerned is maintained in continuous operation by virtue of the driving mechanism 54 which causes constant speed movement of the tape 40. The translating channels in the duplexing control unit 19 are maintained in continuous operation with the motor 34 continually driving the commutator device 25. When no signal is received by the hunter unit 18, the sweep motor 28 is de-energized by virtue of the fact that the contacts 29a of the relay 29 are open. As soon as either one or both of the receivers 10 and 11 are turned on, one or both of the coupling networks 15a and 15b applies a modulated station identification signal as was mentioned above to the link 16 which signal causes release of the relay 29 to close its contacts 29a and cause operation of the sweep motor 28. The sweep motor 28 causes the condenser 22a to be driven continuously to tune the oscillator section of the oscillator modulator 22 back and forth between the limits of the tuning range and simultaneously the styli 51 and 52 are driven back and forth transversely of the recording tape 40. However, as long as the relays 30 and 31 do not close their contacts 30b and 31b, respectively, the styli 51 and 52 are not rendered effective to produce any record or trace on the tape 40. Following the turning on of one or more of the receivers, such as 10 or 11, and tuning a receiver such as 10 or 11 to a particular transmitting station, the oscillator section of the particular receiver tuned in will produce a signal the frequency of which is representative of the station tuned in. Assuming, for example, that the receiver 10 is tuned to a particular transmitting station and considering for the moment that the receiver 11 is not turned on, a signal will be impressed upon the link 16 by the coupling network 15a which is capable of passing through the intermediate frequency amplifier 23 of the hunter unit 18 so as to be impressed on the commutating device 25. Although the translating channels 36 and 37 are continuously conditioned for operation, only the translating channel 36 is capable of passing the modulation components of a signal impressed on the link 16 by the coupling network 15a. Consequently, as soon as the wiper 25c comes into engagement with the segment 25a connected to the channel 36, this signal component is passed by the channel 36 to cause the relay 30 to open its contacts 30a thereby de-energizing the sweep motor 20a to stop the movement of the styli 51 and 52. Simultaneously, the relay 30 closes its contacts 30b so as to render the stylus 51 effective to make a trace on the record tape 40, the position of the trace transversely of the tape being representative of the particular station to which the receiver 10 is tuned. As soon as the wiper 25c has rotated sufficiently to engage the commutator segment 25b the path through the translating channel 36 is interrupted and the path through the translating channel 37 is completed. However, the translating channel 37 cannot pass the modulation components of signal impressed on the link 16 by the coupling network 15a. Consequently, interruption of the translating channel 36 by the commutating device 25 causes the relay 30 to reclose its contacts 30a and re-open its contacts 30b whereupon the sweep motor 28 is re-energized and the stylus 51 is moved away from the tape 40 by means of the spring 64. Continued rotation of the wiper 25c of the commutating device 25 will cause the segment 25a to be again engaged by the wiper 25c, thereby recompleting the channel 36 whereupon the process will be repeated, and the stylus 51 will make another trace on the record tape as indicated in Fig. 3 of the drawings. It will be apparent, therefore, that as long as the receiver 10 remains tuned to the particular station that the stylus 51 will produce a dotted line on the tape 40 indicated at 69, the transverse position of this line on the tape 40 being representative of the particular station tuned in by receiver 10. The breaks in this line 69 correspond to the time when the wiper 25c is in engagement with the segment 25d of the commutating device 25. If the receiver 10 is tuned to a different station, a similar dotted line will be produced on the tape 40 but positioned differently transversely of the tape 40 (see Fig. 3).

Upon decoding the tape the analysis organization can readily determine from the positions of the dotted lines on the tape the particular radio stations tuned in, and if an appropriate colored ink is employed it will immediately indicate that the stylus 51, or in other words the receiver 10, was responsible. In the event that the receiver 11 is tuned in instead of the receiver 10, the same thing occurs with the stylus 52 producing a dotted line such as 70 in Fig. 3 of the drawings, the dots being produced whenever the wiper 25c is in engagement with the commutator segment 25b and the open spaces being produced when the translating channel 37 is inactive by virtue of the wiper 25c being in engagement with the commutator segment 25a. Again, the position of the line 70 transversely of the tape 40 will indicate the particular radio station to which the receiver 11 is tuned. Suppose, for example, that both the receivers 10 and 11 are tuned in to the same station. Then as shown in Fig. 3 of the drawings, superimposed dotted lines corresponding to the traces 69 and 70 are produced, the styli 51 and 52 alternately engaging the tape 40 to produce the dotted lines which are colinearly positioned on the tape. If the receivers 10 and 11 are both tuned to different transmitting stations, then the lines 69 and 70 will be produced by the styli 51 and 52 but the line produced by the stylus 51 will be displaced transversely of the record tape relative to the line which is produced by the stylus 52. In effect, therefore, the commutating device 25 functions as a time sharing device, whereby the time for making a record on the record tape 40 is shared equally by the styli 51 and 52.

As will be apparent from the above explanation, accurate measurement of the factor time is dependent upon continuous and precisely constant speed of movement of the record receiving element or tape 40. However, and as explained above, it has been found in practice that changes in the speed of movement of the record receiving element 40 or stoppage thereof occur either by virtue of power outages or for other reasons. Obviously, the segment of tape length used during an extended recording interval in which a tape speed change of the character described may occur or the point along the tape length at which tape stoppage has occurred is not indicated by the record produced by the station recording styli 51 and 52. In other words, in checking the tape 40 at the central office (prior to decoding the record information inscribed thereon) for the purpose of determining the accuracy of timing, the starting time and the stopping time of the tape must be known along with the standardized speed of tape movement. Heretofore, the starting and stopping time of the tape was manually applied thereto in the manner explained above. In accordance with the present invention, it is desirable that time information be automatically applied to the tape so that the starting and stopping times thereof may readily be determined without any requirement for manually applying this information to the tape. Furthermore, for the known recording interval the amount of tape which should have been used may easily be calculated. If upon checking the length of the tape segment actually used during the recording interval it is found that this length is shorter than the calculated tape length, a tape stoppage or period of tape slow-down during the recording interval is indicated. On the other hand, if the actual length of the tape is longer than the calculated length for the recording interval in question, an excessive speed of tape movement is indicated for at least a portion of the recording interval. If no means for checking the time intervals is available, the entire tape must be discarded for the reason that the record information thereon cannot be accurately correlated with time. This is quite serious when it is remembered that the tape may include the record information for a thirty-day calendar period. In accordance with the present invention means are also provided for obviating the above-mentioned difficulty by applying specific time information to the recording tape at least once during every twenty-four hour period, which information may be different for different days in the week whereby time calculations for every point along the tape can readily be made, and at most a twenty-four hour period of the tape would have to be discarded (unless an extended power outage occurs, resulting from failure of power lines, etc.).

To accomplish this end, the translating and recording apparatus of the present invention includes a fixed tuned wave signal receiver generally designated at 73. This wave signal receiver 73 may be of any conventional type, preferably of the superheterodyne type, and is arranged to be tuned to a specific broadcasting or transmitting station within the area where the receivers 10 and 11 are located. Preferably, the fixed tuned receiver 73 comprises an antenna-ground circuit 74, a fixed tuned radio frequency amplifier 75, an oscillator-modulator 76, an intermediate frequency amplifier 77, and a detector 78 connected in tandem in the order named. Whenever the particular transmitting station to which the fixed tuned receiver 73 is tuned is broadcasting or in other words is "on the air," a signal is received by the receiver 73. The carrier of the signal is rectified by the detector 78 to appear across the resistor 79 as a direct current voltage. This voltage is applied as a negative bias to the grid of a suitable control tube 80. The plate circuit of the tube 80 extends from a source of +B potential in the receiver 73 through the winding of a relay 81 to ground. Consequently when a signal is received by the fixed tuned receiver 73, which occurs whenever the transmitting station to which it is tuned is on the air, the relay 81 is deenergized and its contacts 81a are open. When, however, the transmitting station to which fixed tuned radio receiver 73 goes off the air, no signal is received and the negative bias on the grid of the amplifier 80 is removed so that plate current is permitted to flow, whereupon the relay 81 is energized to close its contacts 81a. Closure of the contacts 81a associated with the relay 81 energizes the electromagnet 53e associated with the stylus 53, which stylus as was mentioned above preferably is in continual engagement with the movable record tape 40 to produce the trace 68 between one edge of the tape and the adjacent row of edge perforations as is clearly shown in Figs. 2 and 3 of the drawings. It will be apparent that when no signal carrier is received by the fixed tuned receiver 73, the stylus 53 is deflected to produce the deflected indication 68a along the tape 40. When a signal carrier is received, the stylus 53 moves to its normal trace position under the influence of suitable biasing means. It should be understood that if desired, the stylus 53 may be operated in a manner similar to the way styli 51 and 52 are operated, so as to make no trace when a signal is received from the fixed tuned receiver 73, for example, and to make a trace by engaging the tape only when the transmitting station to which the fixed tuned receiver 73 is tuned goes off the air. For reasons which will become apparent as the following description proceeds, however, the first-described arrangement is preferable.

It will be understood by those skilled in the art that most transmitting stations have a definite time during each twenty-four hour period when the station is silent or, in other words, is "off the air." For example, many broadcasting stations discontinue broadcasting at 1:00 a. m. and begin broadcasting again at 6:00 a. m. In addition, it is common practice for such broadcasting stations to have a different sign-off and sign-on time on certain days of the week, as for example, Sunday, than for other days during the week, i. e., the station might sign off at 12:00 a. m. Sunday morning and not begin broadcasting again until perhaps 8:00 a. m. Sunday morning. This is shown in Fig. 3 of the drawings with the scale of the time trace 73 greatly compressed in a lengthwise direction. It is thus apparent that if time markings are provided on the recording tape 40 indicating the sign-off and sign-on times of the particular station to which the fixed tuned receiver 73 is tuned, an accurate time check is had since with most broadcasting stations the sign-off and sign-on times are very accurately determined times. It is an important feature of the present invention to provide indications on the tape 40 of at least one of the sign-off or sign-on times of the station to which the fixed tuned receiver 73 is tuned throughout the calendar period for which recordings are made on the tape 40 whereby if there has been a power failure, and the calculated length of tape does not agree with the actual tape obtained for such calendar period, then it is quickly possible to check back with such time markings to determine the errors involved and to discard only small portions of the tape rather than all of it. More important, the arrangement makes the magazine loading feature practical since it automatically provides start time and stop time reference points on the recording element of each magazine used without requiring collaborator assistance.

In accordance with an important feature of the present invention a time base is automatically provided on the recording element which time base is sufficiently unique to definitely and positively relate the information appearing on the recording element to a particular calendar period so that it is entirely unnecessary, as was heretofore required, to apply accurate starting and stopping time indications on the recording element. Furthermore this time base is provided without human aid at the recorder, or the doing of any manual act not already being done for some other purpose. It is a known fact that there is a definite variation from day to day in both the sign on and sign off times of wave signal transmitters. Even though for a particular station the sign on time is generally considered to be the same every day of the week with the exception of Sunday perhaps, actually the station carrier for any transmitting station is turned on at variable times before the actual broadcasting begins which variations might be as much as ten minutes or more from day to day. Similarly a variation of sign off time of several minutes also occurs even though when speaking of the sign off time of a particular station it is generally thought of as being exactly the same every day. Consequently the sign off and sign on times, which for the purposes of the present invention are the turning off and on respectively of the station carrier, vary from day to day to provide a unique constantly changing time pattern whereby it is readily possible, by means of the time information appearing on the record receiving element 40, to definitely relate such element into its proper time position by virtue of such unique time pattern.

The rules of the Federal Communications Commission require accurate logging of the station sign on and sign off times so that this log information is always available for determining this unique time pattern and consequently orientating the record on the recording element into its proper position with respect to time including year, month, day, hour and minute, or in other words date, hour and fractional hours for any calendar period. If desired the analysis organization may provide accurate means for monitoring a predetermined number of stations throughout the country which are employed to furnish the time records such as the trace 68 in Fig. 3 of the drawings so as independently to obtain the unique time pattern of the sign off and sign on times of such stations from which pattern it is readily possible to orientate with respect to time the recording elements 40. Thus it is observed that with the present invention it is entirely unnecessary manually to apply insertion and removal dates to the recording element and still a continuous check with respect to time is obtainable, which continuous check comprises the automatic supplying of multiple date information to a recording element.

In view of the fact that the pattern of sign off and sign on times is uniquely variable throughout a predetermined period of time it is possible to fit the time trace on a particular recording element into its proper place in the pattern even though the pattern is for a long period of time and no knowledge is available as to about where in the pattern the time trace on a particular element fits. As a practical matter, however, the recording elements will be supplied at periodic intervals, probably each less than a month, to the analysis organization and consequently the orientation thereof with respect to the unique pattern of sign off and sign on times is a relatively simple matter.

With the arrangement described thus far, the fixed tuned receiver 73 is continuously energized so as to produce a trace 68 on the tape 40 as long as the broadcasting station to which the fixed tuned receiver is tuned is on the air. As soon as the particular broadcasting station signs off, plate current is permitted to flow through the amplifier 80 so as to energize the relay 81 to close its contacts 81a whereupon the electromagnet 53d is energized, and a displaced trace 68a is produced on the tape 40 as is indicated in Figs. 2 and 3 of the drawings. The beginning and ending points of the trace 68a accurately represent the times when the broadcasting station to which the fixed tuned receiver 73 is tuned, signed off, and came on the air respectively when the arrangement of Fig. 1 is employed. As will be brought out later this is not entirely true with respect to the arrangement of Fig. 2 of the drawings.

From the above description it will be apparent that the fixed tuned receiver 73 must be continuously energized to produce the described operation of the stylus 53. This means, of course, that the tube complement of the receiver 73 will have a relatively short life due to its operation twenty-four hours a day. In Fig. 2 of the drawings, there is illustrated a modification of the arrangement disclosed in Fig. 1 of the drawings relative to the fixed tuned receiver 73 and the stylus 53 for greatly increasing the life of the tube complement by having the fixed tuned receiver energized for only a very short period during each hour say, for example, two minutes during each hour which provides a sufficient time for the tube complement of the receiver 73 to heat up. Arrangements must be provided of course to maintain the receiver 73 in its energized or on position once it is discovered that the station to which it is tuned is off the air, whereby the stylus 53 will produce an accurate indication on the tape 40 of the time when the station to which the fixed tuned receiver 37 comes back on the air which is sufficient information for producing the necessary time correlation traces.

In Fig. 2 of the drawings the relay connected to the output of the fixed tuned receiver 73 through the amplifier 80 is designated as 81' to distinguish it from the relay 81 of Fig. 1 of the drawings. This relay includes the contacts 81a which are connected in the circuit of the electromagnet 53e in exactly the same manner as these contacts in Fig. 1 of the drawings. However, the relay 81' also includes a set of contacts 81b which are open when the contacts 81a are open. The power supply circuit for the fixed tuned receiver 73, which was not indicated in Fig. 1 of the drawings, is illustrated as comprising the conductors 85 connected to the source of power 16. This power supply circuit includes in at least one line thereof a suitable rotating switch generally designated at 86 which is operated by the driving mechanism 54 which drives the tape 40 at constant speed. It is apparent that with this arrangement the switch 86 may close the circuit to the fixed tuned receiver for a predetermined time such as several minutes during each hour and when the power circuit to the fixed tuned receiver is closed, the apparatus will function in the same manner as that disclosed in Fig. 1. Relay 81' is normally de-energized when a signal is received by the fixed tuned receiver 73, and it is also de-energized when the power supply to the fixed tuned receiver 73 is open since in that case no plate voltage for the amplifier 80 is provided. As illustrated in Fig. 2 of the drawings, the contacts 81b are adapted to short-circuit the time control switch 86. Consequently, when the time control switch 86 closes the power supply circuit to energize the fixed tuned receiver 73 at a time when the broadcasting station to which it is tuned is off the air the relay 81' will be energized to close the contacts 81a and 81b, whereupon subsequent opening of time control switch 86 will be incapable of interrupting the power supply to the fixed tuned receiver 73. Consequently the stylus 53 will be displaced to make the trace 68a until the broadcasting station to which the fixed tuned receiver 73 is tuned comes back on the air with the resultant de-energization of the relay 81' whereupon control of the power supply to the fixed tuned receiver 73 is again taken over by the time controlled switch 86.

For those collaborator homes which are necessarily located in areas somewhat remote from transmitting stations it may be desirable to use the sign off time of a particular transmitter as the specific time to be indicated on the record for the reason that it occurs at night when the conditions for radio wave transmission are better than in the morning. Under such circumstances the modification shown in Fig. 10 of the drawings, wherein the fixed tuned receiver is turned on a short time before the station sign off time each evening, may be preferable. The corresponding parts of Fig. 10 have been characterized by the same reference numerals as in Figs. 1 and 2. The fixed tuned receiver designated as 73' in Fig. 10 is illustrated as including a power supply unit 94 which is connected to the power line 16 through a suitable normally open switch 95 which is periodically moved to the closed position by a rotatable cam 96. The amplifier tube 80 of Fig. 1 has been replaced by a twin triode 80' connected to the fixed tuned receiver in the same manner as the triode 80. One plate circuit of the twin triode 80' is connected to a suitable relay 81'' which is in many respects similar to the relays 81 and 81' of Figs. 1 and 2 respectively of the drawings. This relay 81'' is provided with a set of normally open contacts 81a for controlling the stylus coil 53'e of the stylus 53' which is similar to the styli 51 and 52 of Fig. 1. The inscribing portion 53'a of the stylus 53' is normally biased by a spring means 97 so as to be out of engagement with the recording element or tape 40. When the contacts 81a are closed the coil 53'e is energized and the tape 40 is engaged by the stylus 53'. The relay 81'' is also provided with a set of normally closed contacts 81c.

The other plate circuit of the twin triode 80' is connected to a relay 98 having two sets of normally open contacts 98a and 98b respectively. The contacts 98a are seal in contacts for sealing in the relay 98 once it is energized. The contacts 98b are connected in series with the contacts 81c in the energization circuit of a suitable motive or driving means comprising the motor and gear train unit generally designated at 99. This motor and gear train unit 99 is adapted to be energized from the source 16 through suitable conductors 100, in one of which the serially arranged contacts 81c and 98b are located.

The motive means 99 are drivingly connected to the rotatable cam 96 and also a rotatable cam 101, which latter is adapted to control a normally closed switch 102 connected in parallel with the serially arranged contacts 81c and 98b and consequently also being capable of controlling the energization of the motor and gear train unit 99. Preferably the motor and gear train unit is arranged so as to rotate the cams 96 and 101 through one revolution during a period slightly shorter than 24 hours. The cam 96 is provided with a switch controlling projection 96a which is of such a width as to maintain the switch 95 closed for a period of two hours or so with continuous rotation of the driving means 99. The cam 101 on the other hand is provided with a switch controlling portion 101a which is relatively narrow and capable of maintaining switch 102 in the open position for a relatively short time such as fifteen minutes or less with continuous rotation of the motor and gear train unit 99. Furthermore the cams 96 and 101 or the switch controlling portions 96a and 101a respectively are so arranged with respect to each other by proper initial adjustment thereof that the switch 95 is closed a minute or two before the switch 102 is opened. Preferably the driving means 99 drives the cams 96 and 101 at a constant speed to cause the switch 95 to close approximately an hour before the sign off time of the particular transmitting station to which the fixed tuned receiver 73' is tuned. This connects the power source 16 with the power supply unit 94 of the fixed tuned receiver 73' whereby the filaments of the electron discharge tubes are energized. In the event that a signal is received from the particular radio transmitter station by the fixed tuned receiver 73' a potential appears across the resistor 79 which renders the plate circuits of the twin triode 80' sufficiently conductive to energize relays 81'' and 98 respectively whereby the contacts 81a, 98a and 98b are closed and the contacts 81c are opened. The closing of the contacts 81a causes the stylus 53' to engage the recording element 40. The closing of the contacts 98a seals in the relay 98 so that even if no carrier were received by the receiver 73' this relay would still remain energized as long as power was supplied to the receiver 73' through the switch 95. One or two minutes after the switch 95 is closed the switch 102 is opened by the cam 101 so as to cut off the power supply to the driving means 99 whereby the cams 96 and 101 stop rotating. Since the contacts 81c are open at this time the parallel circuit for the driving means 99 through contacts 98b and 81c is open.

As long as the transmitting station to which the fixed tuned receiver 73' is on the air the elements of Fig. 10 remain as described with the stylus 53' producing a trace on the tape 40. When the station to which the fixed tuned receiver 73' signs off, the absence of the receipt of carrier causes the relay 81'' to be deenergized thereby closing contacts 81c and opening contacts 81a. The end of the trace by the stylus 53' on the tape 40 is therefore an accurate indication of time of sign off. The closing of contacts 81c completes the circuit for driving means 99 so that cams 96 and 101 begin to rotate with the result that within a short period of time switch 102 closes and sometime thereafter switch 95 opens cutting off power to the receiver whereby the relay 98 is deenergized and restored to the condition shown in Fig. 10 of the drawings. The driving means 99 drives the cams 96 and 101 so as to make one revolution in about 22 hours so that the switch 95 is closed about an hour before the sign off time of the transmitting station to which fixed tuned receiver 73' is tuned.

It will be apparent that in the event of a power failure of a duration up to something less than an hour the system is unaffected because the cam 96 is arranged to turn on the fixed tuned receiver 73' and establish a time trace about one hour before station sign off time. The only thing that would happen therefore for such a short power outage is the production of a foreshortened time mark the foreshortening thereof indicating the duration of the power outage. In the event of a power outage of several hours or more duration the driving means 99 would at the end of the power outage begin to drive the cams 96 and 101, which are then behind schedule by the amount of the power outage. The switches 95 and 102 are operated in the normal manner and if the carrier is on indicating that the particular transmitting station is broadcasting the power means 99 will become deenergized and remain so until sign off time. If the carrier is off the fixed tuned receiver 73' remains energized due to the open condition of switch 102 until carrier appears after which the usual operation of the relays 81'' and 98 occurs. Under such conditions the fixed tuned receiver 73' may be energized up to 22 or 23 hours for a particular power outage and a time mark of such length will be produced. However when the next sign off time occurs the entire set-up is re-phased and such power outages are readily apparent from an examination of the tape 40.

It will be understood that the arrangement disclosed in Fig. 1 of the drawings provides a trace indicating both the sign off and sign on times but requires continuous energization of the fixed tuned receiver 73. The arrangement disclosed in Fig. 2 of the drawings provides a trace which indicates accurately only the sign on times of the station to which the receiver 73 is tuned. On the other hand, the arrangement disclosed in Fig. 10 of the drawings shows only the sign off times of the transmitting station to which the fixed tuned receiver 73' is tuned. Each of these schemes however provides an accurate time indication at least once during every 24-hour period.

It will be noted in examining the trace 68 with the deflected portion 68a indicating silent periods of the transmitting station to which the fixed tuned receiver 73 is tuned is different for some days of the week than for others. In Fig. 3 of the drawings the days of the week are indicated along the edge of the tape and also the sign-on time of the radio transmitting station to which the fixed tuned receiver 73 is tuned. It is apparent, then that one end at least of the deflected portion 68a therefore is an accurate time marking on the tape 40 from which the record may be correlated and by means of which any power failure or any other abnormal condition which causes the tape 40 to move at other than a constant speed can be determined. Furthermore, the time indications or markings are automatically provided at least once during every twenty-four hour period and no manually applied indication is required on the tape.

In Figs. 4 to 8 inclusive of the drawings the structural details of the translating and recording apparatus 17 are illustrated, the parts of which are designated by the same reference numerals as in the preceding figures. As illustrated in Fig. 4, this translating and recording apparatus 17 comprises a housing 88 in which is mounted the hunter unit 18 and the duplexing control unit 19 as well as the fixed tuned receiver 73. Preferably these various elements of the translating and recording apparatus 17 are mounted in as compact an arrangement as possible and positioned so that the recording mechanism 20 including the magazine 45 is located near one end of the apparatus which may be closed by a suitable cover 89. The magazine 45 is adapted to be inserted into a suitable recess 90 (Figs. 4 and 7) defined in the end of the housing 88 which recess is of such a dimension as to just receive the magazine 45.

As was brought out above, in accordance with the present invention field personnel may be dispensed with for the tape changing process, and the collaborator can remove and replace the magazine 45 which is mailed to the analysis organization. It is desirable that the collaborator in replacing the magazine 45 be required to do a minimum amount of work, and it is especially desirable to avoid what is known as "conditioning of the sample" which might be the case if the collaborator were required to date or apply other time information to the tape upon inserting and removing the same. As was mentioned above, the time information is automatically applied by the stylus 53, and all that the collaborator is required to do is to open the door 89, pull out the magazine 45, and replace it with a new magazine. This replacement of the magazine 45 can be accomplished in a matter of seconds. In addition to this, the collaborator must mail the magazine 45 to the analysis organization in suitable means provided for such mailing.

In order that the ready removal and insertion of the magazine 45 can be accomplished, some play must be provided in the recess 90 defined for the magazine 45 and the magazine itself. This play, of course, will permit a slight lateral movement of the magazine 45 which means that the traces produced by the styli 51, 52, and 53 could be shifted slightly on the tape 40 depending upon the position of the magazine 45 in the recess 90 of the housing 88. A jarring of the housing 88 might also cause a displacement of the magazine 45 relative thereto. In accordance with the present invention, the trace 66 produced continuously by the stylus 53, when the receiver 73 is receiving a signal from the transmitting station to which it is tuned or when the power supply in the receiver 73 is cut off as by the time control switch 86, is a reference line with which the traces produced by the styli 51 and 52 may be correlated during the decoding operation which reference line will clearly indicate whether the magazine 45 is displaced laterally either initially or at any time during the recording period.

In view of the detailed description included above, the operation of the new and improved system and apparatus of the present invention will be apparent to those skilled in the art, and no further discussion thereof will be included herewith. It is apparent that a large amount of the work heretofore required of field personnel can now be accomplished by the collaborator who merely replaces the magazine 45 at specified intervals and mails the replaced magazine to the analysis organization. The collaborator is required to mail the magazine, promptly upon removal thereof, in a suitable mailing container, to the analysis organization and the post mark will give the desired calendar information. If desired the collaborator may write the month and date on the container, for example, to supplement the post mark. All the time information which heretofore was required to be placed on the tape by the field man at the beginning and end of the calendar period including exact time indications can be dispensed with, and instead very reliable time information is obtained through the use of the fixed tuned receiver 73 which not only provides information as good or better than the information supplied thereon by the field man, but in addition gives continual time information which enables the major portion of the tape to be successfully used and decoded even though a power outage has occurred. The percentage of usable tapes is thus greatly increased.

It will be understood that the magazine loading feature of the present invention is applicable regardless of the kind of recording element employed or the number or kind of means for recording the information on the element, and whether said means are fixed or movable.

It will be understood by those skilled in the art that calibration of the wave signal receivers such as 10 and 11 with the recording element in the recorder unit is periodically required. This was heretofore accomplished by a field man who tuned the radio receiver across the dial so as to obtain indications of the associated stylus on the recording element of the various tuning positions of the receiver. Due to the slow movement of the recording element this was a slow process particularly where the recording unit was remote from the receiver. With the present invention this calibration procedure can be accomplished in a very short time by the use of a special magazine indicated by the reference numeral 45' in Fig. 11 of the drawings. This special magazine may be identical in every respect with the magazine 45 described above, except that it is provided with a special step-up gear unit designated by the reference numeral 103 whereby the recording element therein is caused to travel at a much higher speed, say 10 to 20 times faster than the speed of the movement of the record receiving element 40 in the conventional magazine 45. This is therefore another advantage of the present invention since the calibration operation can be completed in a fraction of the time heretofore required.

It will be apparent to those skilled in the art that the present invention is not limited to the particular constructions and arrangements shown and described, but that changes and modifications may be made without departing from the spirit and scope of the invention, and it is aimed in the appended claims to cover all such changes and modifications.

What is claimed as new and desired to be secured by Letters Patent of the United States is:

1. In a system for recording information relative to the particular radio transmitting station to which a wave signal receiver is tuned, means responsive to the tuning of said receiver when tuned to receive signals from any one of a plurality of transmitting stations for producing on a movable record receiving element a record representative of the particular tuning condition of said receiver, means of a type subject to occasional operating interruptions for indeterminate periods for moving said element in a predetermined manner relative to time, and signal receiver means responsive to the sign-off or sign-on time of a predetermined transmitting station for producing a time indication on said element, whereby a check on the operation of said means for moving said element is periodically obtained.

2. In a system for recording information relative to the particular radio transmitting stations to which each of a plurality of wave signal receivers is tuned, means responsive to the tuning of said receivers when tuned to receive signals from any one of a plurality of transmitting stations for producing on a movable record receiving element individual records for each receiver representative of the particular tuning condition of said receivers, means of a type subject to occasional indeterminate operating interruptions for moving said element at a constant speed, and signal receiver means responsive to the time a predetermined transmitting station begins broadcasting for producing an indication on said element.

3. In a system for recording information relative to the particular radio transmitting station to which a wave signal receiver is tuned, means responsive to the tuning of said receiver when tuned to receive signals from any one of a plurality of transmitting stations for producing on a movable recording tape a record characteristic of the particular tuning condition of said receiver, a constant speed electric motor for moving said tape, and means responsive to the absence of a signal from a predetermined transmitting station for producing a time indication on said tape, whereby a power failure causing interruption of the operation of said motor is readily detectable from an examination of said time indication.

4. In a system for recording information relative to the particular radio transmitting station to which a wave signal receiver is tuned, comprising translating and recording apparatus responsive to modulation components produced by said receiver when tuned to a transmitting station which components have different characteristics for different transmitting stations to which said receiver is tuned, means for recording on a continuously movable record receiving element associated with said apparatus information relating to the transmitting stations tuned in by said receiver, means for moving said element in a predetermined manner, and means responsive to the absence of the receipt of a signal from a predetermined transmitting station for producing periodic time indications on said element as a function of the sign-on and sign-off operation of said predetermined transmitting station, whereby a check on the operation of said means for moving said tape is obtained.

5. In a system for recording information relative to the particular radio transmitting stations to which a wave signal receiver is tuned with reference to time, means responsive to the tuning of said receiver when tuned to receive signals from any one of a plurality of transmitting stations for producing on a movable recording tape a record representative of the particular stations to which said receiver is tuned, means of a type subject to occasional operating interruptions for indeterminate periods for moving said tape in a predetermined manner relative to time, and means for automatically applying time markings on said tape to aid in decoding the record produced thereon whereby it is possible to determine exactly not only the stations to which said receiver was tuned but also when and for what periods of time, said last-mentioned means comprising means for indicating throughout a calendar period at least one end of the time periods as a function of the time a predetermined station is on or off the air.

6. In a system for recording information relative to the particular radio transmitting stations to which each of a plurality of wave signal receivers is tuned, means responsive to the tuning of said receivers when tuned to receive signals from any one of a plurality of transmitting stations for producing on a movable recording tape individual records for each receiver representative of the particular tuning condition of said receivers, means of a type subject to occasional indeterminate operating interruptions for moving said tape at a constant speed, and means including a fixed tuned receiver tuned to a predetermined transmitting station for producing indications on said tape of at least one end of the time interval during each twenty-four hour period that said predetermined transmitting station is not producing a signal, whereby an accurate time check as to the constancy of speed of said moving tape is obtainable.

7. In a system for recording information relative to the particular radio transmitting station to which a wave signal receiver is tuned, means responsive to the tuning of said receiver when tuned to receive signals from any one of a plurality of transmitting stations for producing on a movable record receiving element a record characteristic of the particular tuning condition of said receiver, driving means for moving said element in a predetermined manner and means for periodically placing accurately determinable time markings on said element for furnishing a time base for the record on said element as well as a check on the operation of said driving means, said last mentioned means comprising means responsive to the absence of the receipt of a signal produced by a predetermined transmitting station which begins producing a signal at a precisely known time every day.

8. In a system for recording information relative to the particular radio transmitting station to which a wave signal receiver is tuned, comprising translating and recording apparatus responsive to a signal representative of the frequency of the signal produced by the local oscillator of said receiver when said receiver is tuned to a transmitting station which signal produced by said local oscillator has a different characteristic for each different transmitting station to which said receiver is tuned, means for recording on a continuously movable element associated with said apparatus information relating to the transmitting stations tuned in by said receiver, means for moving said element in a predetermined manner, and means for automatically and periodically placing time markings on said element indicative of one or both of the sign-off or sign-on times of a predetermined transmitting station located within the area in which said apparatus is disposed, whereby a check on the operation of said means for moving said element is obtained.

9. Apparatus for recording information relative to the particular radio broadcasting stations to which one or more wave signal receivers are tuned, comprising a recording mechanism including a mailable magazine having disposed therein a driven member and a movable record receiving element associated therewith, means outside said magazine and engageable with said driven member when said magazine is associated with said recording mechanism for moving said element at a constant speed, a stylus adapted to extend into said magazine to produce an indication on said element representative of the tuning condition of at least one of said receivers, and means comprising a wave signal receiver for automatically applying time markings on said element in said magazine.

10. Apparatus for recording information relative to the particular radio broadcasting stations to which one or more wave signal receivers are tuned, comprising a recording mechanism including a recorder portion and a mailable magazine, said magazine having disposed therein a driven member and a movable record receiving element associated therewith, means engageable with said driven member when said magazine is associated with said recorder portion for moving said element in a predetermined manner, means for producing a record on said element continuously representative of the tuning condition of at least one of said receivers, and means for automatically applying an indication on said element in said magazine to provide a reference whereby the position of said magazine relative to said recorder portion is indicated.

11. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess and having mounted therein a driven member and a movable record tape, means outside said magazine and engageable with said driven member when said magazine is associated with said recording mechanism for moving said element at a constant speed, a first means for producing indications on said tape representative of the tuning condition of at least one of said receivers with respect to time, and a second means for producing a time trace on said tape, at least a portion of said time trace providing a reference indicating the particular position of said magazine in said housing when said indications are produced on said tape.

12. Apparatus for recording information relative to the particular radio broadcasting station to which one or more wave signal receivers are tuned, comprising a recording mechanism including a mailable magazine having disposed therein a driven member and a movable record tape associated therewith, means outside said magazine and engageable with said driven member when said magazine is associated with said recording mechanism for moving said tape in a predetermined manner, a first stylus adapted to produce indications on said tape representative of the tuning condition of at least one of said receivers, a second stylus, means for positioning said second stylus in response to the operating condition of a predetermined broadcasting station so that a timing trace is produced on said tape which varies in dependence upon whether or not said predetermined broadcasting station is transmitting a signal, whereby precisely known time indications are automatically applied to said tape.

13. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess, a driven member including a sprocket rotatably mounted in said magazine, a record tape having edge perforations engageable by said sprocket, means outside said magazine and engageable with said driven member when said magazine is associated with said recording mechanism for moving said sprocket and consequently said tape at a constant speed, a first stylus adapted to extend into said magazine to produce a trace on said tape between said perforations, the transverse position of said trace between said perforations being representative of the tuning condition of at least one of said receivers, and a second stylus adapted to extend into said magazine for producing a time trace on said tape between one edge of said tape and the adjacent row of perforations, at least a portion of said time trace providing a reference line indicating the particular position of said magazine in said housing when said indications are produced on said tape.

14. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess, a driven member including a sprocket rotatably mounted in said magazine, a record tape having edge perforations engageable by said sprocket, means outside said magazine and engageable with said driven member when said magazine is associated with said recording mechanism for moving said sprocket and consequently said tape at a constant speed, a first stylus adapted to extend into said magazine to produce a trace on said tape between said perforations, the transverse position of said trace between said perforations being representative of the tuning condition of at least one of said receivers, and a second stylus adapted to extend into said magazine for producing a time trace on said tape between one edge of said tape and the adjacent row of perforations.

15. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess and having mounted therein a driven member and a movable record tape, means outside said magazine and engageable with said driven member when said magazine is associated with said recording mechanism for moving said tape at a constant speed, a first stylus adapted to extend into said magazine to produce indications on said tape representative of the tuning condition of at least one of said receivers with respect to time, and a second stylus adapted to extend into said magazine for producing a trace on said tape, a fixed tuned receiver constantly tuned to a predetermined transmitting station, and means for controlling the position of said second stylus in dependence upon whether a signal from said predetermined transmitting station is received by said fixed tuned receiver.

16. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess and having mounted therein a driven member and a movable record tape, means outside said magazine and engageable with said driven member when said magazine is associated with said recording mechanism for moving said tape at a constant speed, a first stylus adapted to extend into said magazine to produce indications on said tape representative of the tuning condition of at least one of said receivers with respect to time, and a second stylus adapted to extend into said magazine for producing a continuous trace on said tape, a fixed tuned receiver constantly tuned to a predetermined transmitting station, and means for controlling the position of said second stylus in dependence upon whether a signal from said predetermined transmitting station is received by said fixed tuned receiver.

17. In a system for recording information relative to the particular radio transmitting station to which a wave signal receiver is tuned, means responsive to the tuning of said receiver when tuned to receive signals from any transmitting station for producing on a movable record receiving element a record characteristic of the particular tuning of said receiver, driving means for moving said element in a predetermined manner, means for periodically placing accurately determinable time markings on said element for furnishing a time base for the record on said element as well as a check on the operation of said driving means, comprising a fixed tuned receiver tuned to a predetermined transmitting station, means responsive to the absence of the receipt of a signal from said predetermined transmitting station by said fixed tuned receiver for producing a predetermined trace on said element, and means responsive to the receipt of a signal from said predetermined transmitting station by said fixed tuned receiver for producing a different predetermined trace on said element, at least one of the junction points between said traces providing a known precise time indication.

18. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess, a driven member including a sprocket rotatably mounted in said magazine, a record tape having two rows of perforations parallel to the edges thereof engageable by said sprocket, driving means outside said magazine and engageable with said driven member when said magazine is associated with said recording mechanism for moving said sprocket and consequently said tape at a constant speed, a first stylus adapted to extend into said magazine to produce a trace on said tape between said perforations representative of the tuning condition of at least one of said receivers, a second stylus adapted to extend into said magazine for producing a time trace on said tape between one edge of said tape and the adjacent row of perforations, a fixed tuned receiver tuned to a predetermined transmitting station which comes on the air at a precisely known time every day, means for controlling said second stylus in response to the presence or absence of a signal from said predetermined transmitting station, means controlled by said driving means for periodically supplying power to said fixed tuned receiver for short intervals of time, and means responsive to the absence of a signal from said transmitting station for continuously maintaining the power supply to said fixed tuned receiver once the power supply is restored by said means controlled by said driving means, whereby said fixed tuned receiver is effective to control said second stylus at the instant said predetermined transmitting station comes on the air so that accurate time information is automatically applied to said tape.

19. Apparatus for recording information relative to the particular radio broadcasting stations to which one or more wave signal receivers are tuned, comprising a recording mechanism including a mailable magazine having disposed therein a driven member and a movable recording tape associated therewith, driving means outside said magazine and engageable with said driven member when said magazine is associated with said recording mechanism for moving said tape at a constant speed, a first means for producing an indication on said tape representative of the tuning condition of at least one of said receivers, a second means for automatically applying a time trace on said tape, a fixed tuned receiver tuned to a predetermined transmitting station which comes on the air at a precisely known time every day, means for controlling said second means in response to the presence or absence of a signal from said predetermined transmitting station, means controlled by said driving means for periodically supplying power to said fixed tuned receiver only for short intervals of time, and means responsive to the absence of a signal from said transmitting station for continuously maintaining the power supply to said fixed tuned receiver once the power supply is restored by said means controlled by said driving means, whereby said fixed tuned receiver is effective to control said second means at the instant said predetermined transmitting station comes on the air so that accurate time information is automatically applied to said tape.

20. In a system for recording information relative to the particular radio transmitting station to which a wave signal receiver is tuned, means responsive to the tuning condition of said receiver when tuned to receive signals from any transmitting station for producing on a movable recording element a record characteristic of the particular tuning conditions of said receiver, driving means for moving said element in a predetermined manner, means for periodically placing accurately determinable time markings on said element for furnishing a time base for the record on said element as well as a check on the operation of said driving means, comprising a fixed tuned receiver tuned to a predetermined transmitting station, means responsive to the absence of the receipt of a signal from said predetermined transmitting station by said fixed tuned receiver for producing a predetermined trace on said element, means responsive to the receipt of a signal from said predetermined transmitting station by said fixed tuned receiver for producing a different predetermined trace on said element, at least one of the junction points between said traces providing a known precise time indication, means for energizing said fixed tuned receiver at periodic intervals during each day but only for relatively short periods each time, and means for maintaining said fixed tuned receiver continuously energized once no signal is received from said predetermined transmitting station upon one of the periodic energizations of said fixed tuned receiver until said predetermined transmitting station again begins to transmit a signal.

21. In combination with a record receiving device including a recording element and means for moving said element in a predetermined manner, means periodically operative in a predetermined manner at precisely known times, means including an electronic device responsive to said last mentioned means for placing time indications on said element at said precisely known times, and means for automatically rendering said electronic device ineffective for a substantial portion of the time except for periods preceding said precisely known times.

22. In combination with a record receiving device including a recording element and means for moving said element at a constant speed, means periodically operative in a predetermined manner at precisely known times, means including an electronic device responsive to said last mentioned means for placing time indications on said element at said precisely known times, means for rendering said electronic device ineffective for all but periodic short intervals of time, and means for automatically maintaining said electronic device effective for periods prior to and including said precisely known times.

23. In a system for recording information relative to the particular radio transmitting station to which a wave signal receiver is tuned, means for recording on a continuously movable element associated with said apparatus information relating to transmitting stations tuned in by said receiver, means for moving said element in a predetermined manner with respect to time, and means responsive to one or both of the sign-off or sign-on times of a predetermined transmitting station for automatically and periodically placing time markings on said element whereby a check on the constant speed operation of said means for moving said element is obtained.

24. In a system for recording information relative to the particular radio transmitting station to which a wave signal receiver is tuned, means for recording on a continuously movable element associated with said apparatus information relating to transmitting stations tuned in by said receiver, means for moving said element at a constant speed, and means responsive to one or both of the sign-off or sign-on times of a predetermined transmitting station for automatically and periodically placing time markings on said element whereby a check on the constant speed operation of said means for moving said element is obtained and the variations in sign-off or sign-on times or both of said predetermined transmitting station from day to day during a particular week permit accurate identification of portions of said element as having information recorded thereon as of a particular date.

25. In a system for recording information relative to the particular radio transmitting station to which a wave signal receiver is tuned, means for recording on a continuously movable element associated with said apparatus information relating to transmitting stations tuned in by said receiver, means for moving said element at a constant speed, and means responsive to one or both of the sign-off or sign-on times of a predetermined transmitting station which may vary from day to day for automatically and periodically placing time markings on said element whereby a check on the constant speed operation of said means for moving said element is obtained from day to day.

26. Apparatus for recording information relative to the particular radio broadcasting stations to which one or more wave signal receivers are tuned, comprising a recording mechanism including a mailable magazine having disposed therein a driven member and a movable record receiving element associated therewith, means outside said magazine and engageable with said driven member when said magazine is associated with said recording mechanism for moving said element at a constant speed, means for producing an indication on said element representative of the tuning condition of at least one of said receivers, and means including a wave signal receiver for automatically applying time markings on said element in said magazine.

27. In a system for recording information relative to the particular radio transmitting station to which a wave signal receiver is tuned, means responsive to the tuning of said receiver when tuned to receive signals from any transmitting station for producing on a movable record receiving element a record characteristic of the particular tuning of said receiver, driving means for moving said element at a constant speed, means for periodically placing accurately determinable time markings on said element for furnishing a time base for the record on said element as well as a check on the operation of said driving means, comprising a fixed tuned receiver tuned to a predetermined transmitting station, means responsive to the absence of the receipt of a signal from said predetermined transmitting station by said fixed tuned receiver for causing said means for placing time markings on said element to affect said element in a predetermined manner, and means responsive to the receipt of a signal from said predetermined transmitting station by said fixed tuned receiver for causing said means for placing time markings on said element to affect said element in a different predetermined manner, whereby at least one of the points on said element where a change in the manner in which it is affected by said means for placing time markings on said element occurs provides a precisely known time indication.

28. For use with apparatus for recording information relative to the particular radio broadcasting stations to which one or more wave signal receivers are tuned of the type comprising a recording mechanism including a mailable magazine having disposed therein a driven member and a movable record receiving element associated therewith together with means for moving said element at a relatively low constant speed as well as including means for producing an indication on said element in said magazine representative of the tuning condition of at least one of said receivers, a testing magazine adapted to be substituted for said mailable magazine for testing or calibration purposes including means for causing a movable record receiving element associated therewith to be driven at a very high speed of the order of ten or more times said relatively low constant speed.

29. Apparatus for recording information relative to the particular radio broadcasting stations to which one or more wave signal receivers are tuned, comprising a recording mechanism including a mailable magazine having disposed therein a driven member and a movable record receiving element associated therewith, means engageable with said driven member when said magazine is associated with said recording mechanism for moving said element in a predetermined manner, means for producing an indication on said element representative of the tuning condition of at least one of said receivers, and means comprising a wave signal receiver for automatically applying a time record on said element in said magazine.

30. Apparatus for recording information relative to the particular radio broadcasting stations to which one or more wave signal receivers are tuned, comprising a recording mechanism including a mailable magazine having disposed therein a driven member and a movable recording tape associated therewith, driving means outside said magazine and engageable with said driven member when said magazine is associated with said recording mechanism for moving said tape in a predetermined manner, a first means adapted for producing a continuous indication on said tape representative of the tuning condition of at least one of said receivers, a second means for automatically applying a time trace on said tape, a fixed tuned receiver tuned to a predetermined transmitting station which goes off the air at a precisely known time every day, means for controlling said second means in response to the presence or absence of a signal from said predetermined transmitting station, cam means, motive means for driving said cam means to supply power to said fixed tuned receiver a short time preceding the sign-off time of said transmitting station, means for deenergizing said motive means shortly after power is supplied to said fixed tuned receiver thereby maintaining the power supply to said fixed tuned receiver, means responsive to the absence of the receipt of a signal from said transmitting station for reenergizing said motive means to cause said cam means to cut off the power supply to said fixed tuned receiver, and for actuating said second means, whereby said fixed tuned receiver is effective to control said second means at the instant said predetermined transmitting station goes off the air so that accurate time information is automatically applied to said tape.

31. In a system for recording information relative to the particular radio transmitting station to which a wave signal receiver is tuned, means responsive to the tuning condition of said receiver when tuned to receive signals from any transmitting station for producing on a movable record receiving element a record characteristic of the particular tuning conditions of said receiver, driving means for moving said element in a predetermined manner, means for periodically placing accurately determinable time markings on said element for furnishing a time base for the record on said element as well as a check on the operation of said driving means, comprising a fixed tuned receiver tuned to a predetermined transmitting station, means responsive to the receipt of a signal from said predetermined transmitting station by said fixed tuned receiver for producing a predetermined trace on said element, and means for turning on said fixed tuned receiver once each day for a short period preceding and including the sign-off time of said predetermined transmitting station whereby said means responsive to the receipt of a signal is rendered effective to produce said trace, the end of said trace being indicative of the sign-off time of said predetermined transmitting station and providing an accurate time indication on said element.

32. Apparatus for recording information relative to the particular radio broadcasting stations to which one or more wave signal receivers are tuned, comprising a recording mechanism including a housing having a recess defined therein, a readily removable and insertable mailable magazine adapted to be disposed in said recess, a driven member rotatably mounted in said magazine, a record tape movable with said driven member, driving means engageable with said driven member when said magazine is associated with said recording mechanism for moving said tape in a predetermined manner, a first means for producing a trace on said tape representative of the tuning condition of at least one of said receivers, a second means for producing a time trace on said tape, a fixed tuned receiver tuned to a predetermined transmitting station which signs off the air at a precisely known time every day, means for controlling said second means in response to the presence or absence of a signal from said predetermined transmitting station, means for supplying power to said fixed tuned receiver only for a short period preceding the sign-off time of said predetermined transmitting station, said period including said sign-off time, and means responsive to the absence of the receipt of a signal from said transmitting station following the supplying of power to said fixed tuned receiver for actuating said second means, whereby said fixed tuned receiver is effective to control said second means at the instant said predetermined transmitting station signs off the air so that accurate time information is automatically applied to said tape.

33. In a system for recording data pertinent to the tuning condition of a radio receiver, whereby a statistical analysis of the listening habits of wave signal receiver users may be made, a recorder comprising a detachable mailable magazine including a movable record receiving element, means for moving said record receiving element in a predetermined manner when said magazine is associated with said recorder, means for recording information on said element indicative of the tuning condition of said receiver, and automatic means for recording a known unique time pattern on said element which differs sufficiently from day to day so that said time pattern affords a means for orientating said element into its proper time position during any calendar period without reference to the beginning or end of said record receiving element.

34. In a system for recording data pertinent to the tuning condition of a radio receiver, whereby a statistical analysis of the listening habits of wave signal receiver users may be made, a recorder comprising a detachable mailable magazine including a movable record receiving element, means for moving said record receiving element a predetermined manner when said magazine is associated with said recorder, means for recording information on said element indicative of the tuning condition of said receiver, and automatic means responsive to the operation of a predetermined radio transmitter for recording a known unique time pattern on said element which differs sufficiently from day to day so that said time pattern affords a means for orientating said element into its proper time position during any calendar period.

HENRY A. RAHMEL.

References Cited in the file of this patent

UNITED STATES PATENTS

| Number | Name | Date |
|---|---|---|
| 1,801,814 | Legg | Apr. 21, 1931 |
| 1,805,665 | Hough | May 19, 1931 |
| 1,831,458 | Livingston | Nov. 10, 1931 |
| 1,926,703 | Spence, Jr. | Sept. 12, 1933 |
| 2,006,077 | Moritz, Jr. | June 25, 1935 |
| 2,092,544 | Woodruff | Sept. 7, 1937 |
| 2,170,505 | Peters | Aug. 22, 1939 |
| 2,202,547 | Bushnell | May 28, 1940 |
| 2,213,886 | Potter | Sept. 3, 1940 |
| 2,257,100 | Belock | Sept. 30, 1941 |
| 2,275,497 | Berndt | Mar. 10, 1942 |
| 2,337,568 | Owens | Dec. 28, 1943 |
| 2,342,167 | Potter | Feb. 22, 1944 |
| 2,344,675 | Burts | Mar. 21, 1944 |
| 2,354,836 | Rusch | Aug. 1, 1944 |
| 2,362,019 | Moore | Nov. 7, 1944 |
| 2,370,166 | Hooven | Feb. 27, 1945 |
| 2,375,433 | Minton | May 8, 1945 |
| 2,397,562 | Potter | Apr. 2, 1946 |
| 2,436,512 | Hollywood | Feb. 24, 1948 |
| 2,457,699 | Marsen | Dec. 28, 1948 |
| 2,513,360 | Rahmel | July 4, 1950 |
| 2,514,086 | Owens | July 4, 1950 |